United States Patent [19]

Arlie

[11] Patent Number: 5,692,675
[45] Date of Patent: Dec. 2, 1997

[54] APPARATUS AND METHOD FOR DIVERTING SHOWER WATER OF IMPROPER TEMPERATURE FROM BATHER

[76] Inventor: Daniel Arlie, 2844 Waverley St., Palo Alto, Calif. 94306

[21] Appl. No.: 383,868

[22] Filed: Feb. 6, 1995

[51] Int. Cl.$^6$ ............................................. G05D 23/09
[52] U.S. Cl. ................................. 236/93 B; 236/101 D
[58] Field of Search ......................... 236/93 B, 93 R, 236/101 D

[56] References Cited

U.S. PATENT DOCUMENTS

| | | | |
|---|---|---|---|
| 1,806,630 | 5/1931 | Giesler | 236/93 R |
| 2,200,248 | 5/1940 | Hoffman | 236/93 R X |
| 2,801,708 | 8/1957 | Fisher | 236/93 R X |
| 2,902,262 | 9/1959 | Morse | 236/93 R X |
| 3,291,391 | 12/1966 | Mesco | 236/93 B X |
| 3,318,524 | 5/1967 | Kehm | 236/101 D X |
| 4,281,790 | 8/1981 | McGinnis | 236/93 B |
| 4,543,941 | 10/1985 | Newell | 236/101 D X |
| 5,110,045 | 5/1992 | Glasson et al. | 236/101 D X |

Primary Examiner—William E. Tapolcai

[57] ABSTRACT

The apparatus consisting of a rotating shield mounted in front of the shower head with a pattern of holes that, when aligned with a corresponding pattern of holes in the shower nozzle, allow the water to pass through to the bather. The shield is turned into or out of alignment by a bi-metal thermally sensitive spring which, sensing too hot or too cold water, rotates clockwise or counter clockwise. The water is then blocked by the shield and, its momentum now diminished, pours out of an opening in the bottom of the shower head where it can be hand tested and adjusted by the bather. When the proper temperature is achieved, the bi-metal spring turns the guard plate holes into alignment with the shower nozzle outlet holes and water is allowed to spray onto the bather. A water mixing/buffer chamber located between the thermal element and the outlet nozzle affords the unit time to respond to incoming water appropriately by taking a measure of time to fill up. It also tempers the temperature of the water exiting the unit during the split second that the guard plate holes pass over the shower nozzle holes when rotating from one off position to another.

1 Claim, 3 Drawing Sheets

FIG. 3

| WATER INPUT | CHAMBER WATER | CHAMBER STATUS | DIVERTER RESPONSE | WATER OUT |
|---|---|---|---|---|
| WARM | EMPTY | FILLS WHILE... | OPENS LEFT TO RIGHT | WARM |
| HOT | EMPTY | FILLS WHILE... | CLOSES LEFT TO RIGHT | NONE |
| COLD | EMPTY | FILLS WHILE... | STAYS LEFT CLOSED | NONE |
| WARM | COLD | PURGES COLD | OPENS LEFT TO RIGHT | WARM |
| WARM | HOT | PURGES HOT | OPENS RIGHT TO LEFT | WARM |
| COLD | HOT | BOTH TEMPS. MIX INTO WARM | PASSES OVER OUTLET | SMALL BURST OF WARM |
| HOT | COLD | BOTH TEMPS. MIX INTO WARM | PASSES OVER OUTLET | SMALL BURST OF WARM |
| HOT | WARM | FILLS WITH HOT | CLOSE LEFT TO RIGHT | NONE |
| COLD | WARM | FILLS WITH COLD | CLOSE RIGHT TO LEFT | NONE |

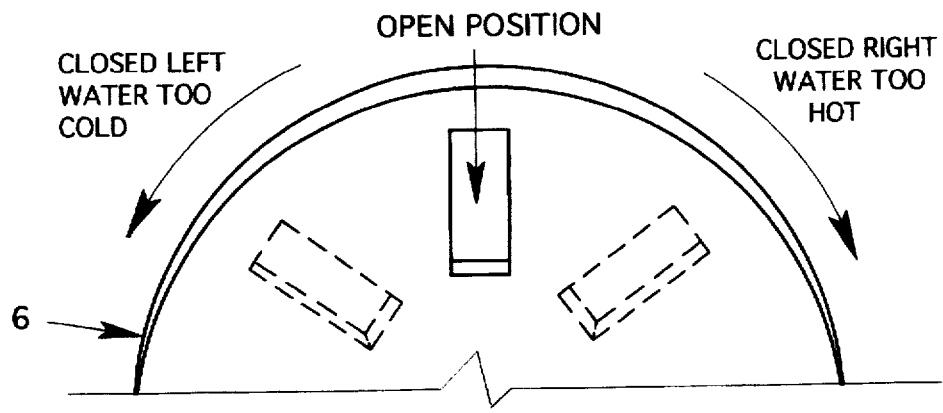

5,692,675

APPARATUS AND METHOD FOR DIVERTING SHOWER WATER OF IMPROPER TEMPERATURE FROM BATHER

BACKGROUND OF THE INVENTION

1. Field of the Invention

The present invention pertains to water valve art and more particularly to devices which mix two or more fluid supplies at dissimilar temperatures where one supply is controlled according to the temperature of the mixed fluid or the temperature of one of the fluid supplies and more particularly to a temperature sensitive shower diverter mechanism that diverts the water from the bather when the water is too hot or too cold and automatically resets when water of the proper temperature arrives. (Search class 236)

2. Background Art

Thermostatic bypass valves are well known in the art and have long been utilized in supply lines to showers as well as wash basins, bathtubs etc. in an effort to deal with erratic water supply temperature and pressure, such as might occur when an appliance such as a dishwasher or re-filling toilet taps into the same supply lines as the shower. These may be adequate to prevent serious injury caused by sustained exposure to scalding water but are no assurance of a comfortable shower since all mechanical thermal sensors take a moment to react and thus cannot prevent small but uncomfortable amounts of cold or hot water from hitting the bather. Electrically actuated valves controlled by electronic sensors may be quicker but would be impractical in a shower environment, requiring waterproof housing and posing more problems than it solves by requiring a reliable electrical power source at all times.

DESCRIPTION OF THE PRIOR ART

The U.S. Pat. No. 4,563,780 discloses an apparatus for sensing the temperature of water flowing to a shower or wash basin and diverting the flow to a drain line when outside a preset temperature range. This design has the drawback of being a complex system that must be installed at great cost and it would still allow a burst of cold water to hit the bather when first turned on.

U.S. Pat. No. 4,854,499 takes the same concept of diverting improper temperature water from the bather, but moves the valve to just behind the shower head to eliminate most of the cold water that would exit the system on its initial activation. It has the drawback of being impractically expensive and un-reliable in its electro-mechanical embodiment, requiring a battery recharged by a water powered turbo generator to avoid the dangers of being powered by hook-up to the 120v. house power line. The other embodiments employ bi-mettalic element, temperature actuated valves to re-direct the high pressure water flow at the appropriate time. The drawback of these is that the split second it takes for these elements to react is enough time to let a blast of ice cold or scalding hot water hit the bather. These bi-metal elements would also be required to exert some measure of force to re-direct or interrupt a high pressure flow of water that will, through time, deposit plaque and scale on valve surfaces. It is doubtful that bi-metal discs or springs could exert such force reliably. In any anti-scald mechanism, reliability is critical to the safety and utility of the device. Therefor an improved method of diverting shower water is needed to assure not only the safety of the bather but the comfort as well.

SUMMARY OF THE INVENTION

The apparatus consists of a shower head with a temperature actuated rotating shield mounted in front of the shower nozzle that turns into the stream of water blocking its flow when the water is too hot or too cold. When the water has been mixed to an appropriate temperature, the shield rotates out of the way allowing the water to reach the bather. This works in conjunction with a water mixing buffer chamber which tempers the temperature of the small amount of water that exits the unit while the rotating shield is in transition. It also allows time for the initial positioning of the shield by taking a moment to fill up before the water can spray from the nozzle.

It is the object of this invention to safely and reliably redirect water of improper temperature for bathing away from the bather by blocking the waters flow after it has been sprayed from the shower head, it being a much easier job to redirect water flowing as a result of its velocity only, its gauge pressure (back pressure) having been lost when it left the confines of the supply line. Further more to achieve this without valves or touching moving parts to clog, jam or get stuck.

A further object is to provide protection from even a split second blast of hot or cold water by requiring the water to fill a buffer chamber before it exits the shower thus allowing the thermally sensitive diverter actuating mechanism the time it needs to react to supply water temperature changes. This chamber also mixes hot water coming into a cold water filled chamber (or vice versa,) in such a fashion as to allow only warm water to exit the device during the brief moment that the guard plate holes pass over the nozzle outlet holes while the mechanism reacts to the water of one extreme temperature entering the chamber filled with water of the opposite extreme temperature. This would happen when the shower is initially turned on, one valve at a time, assuming that the proper temperature is not immediately achieved by the turning on of the second spigot as is usually not the case.

BRIEF DESCRIPTION OF DRAWINGS

The present invention will be more fully understood by reference to the following detailed description thereof when read in conjunction with the attached drawings, and wherein:

FIG. 3. is a diagram of how the mechanism would react to various water input temperatures in various sequences.

DETAILED DESCRIPTION OF DRAWINGS

Figure 1:
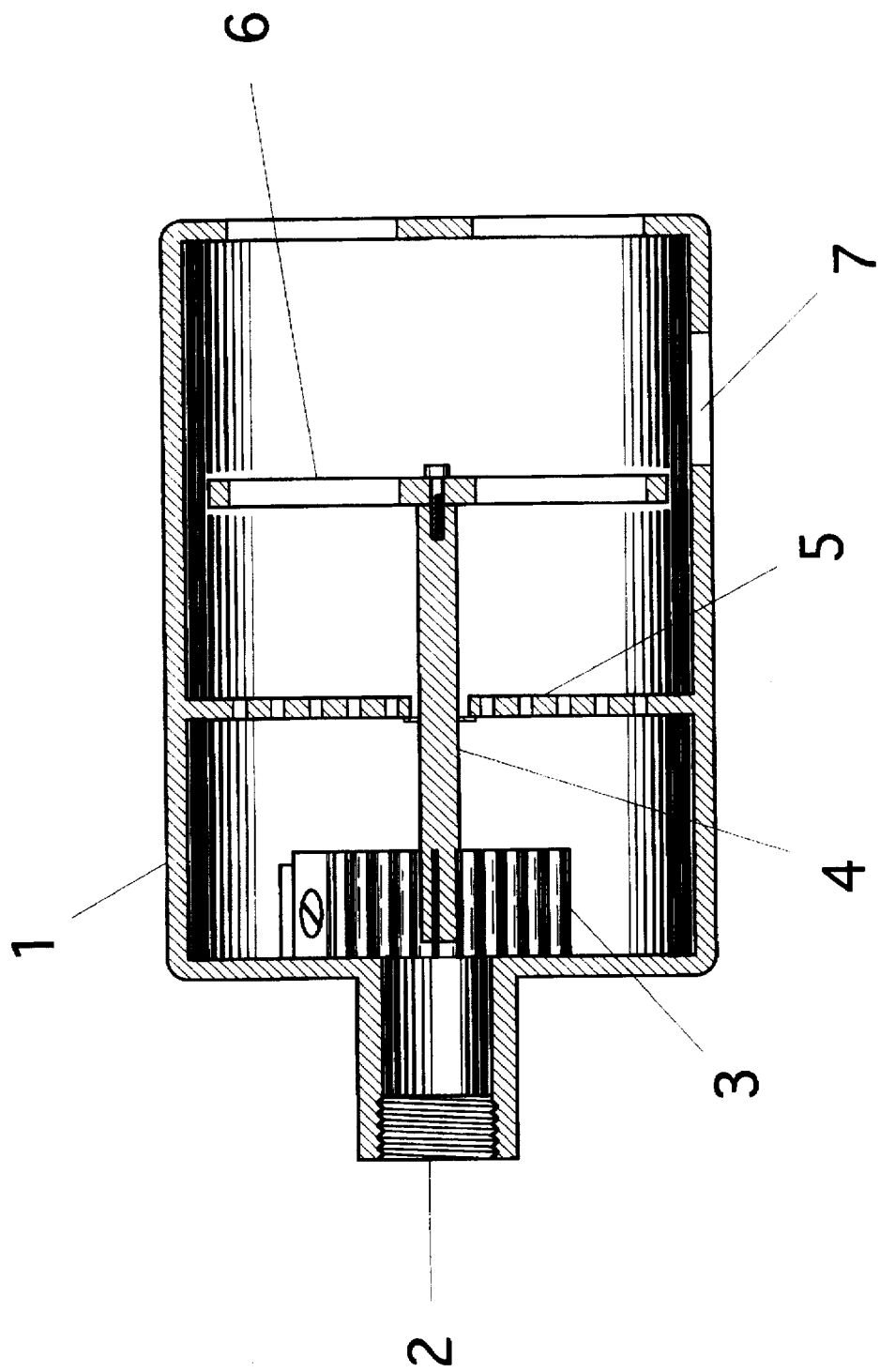
FIG. 1. is a sectional view of the preferred embodiment of the diverting apparatus of the present invention.
Figure 2:
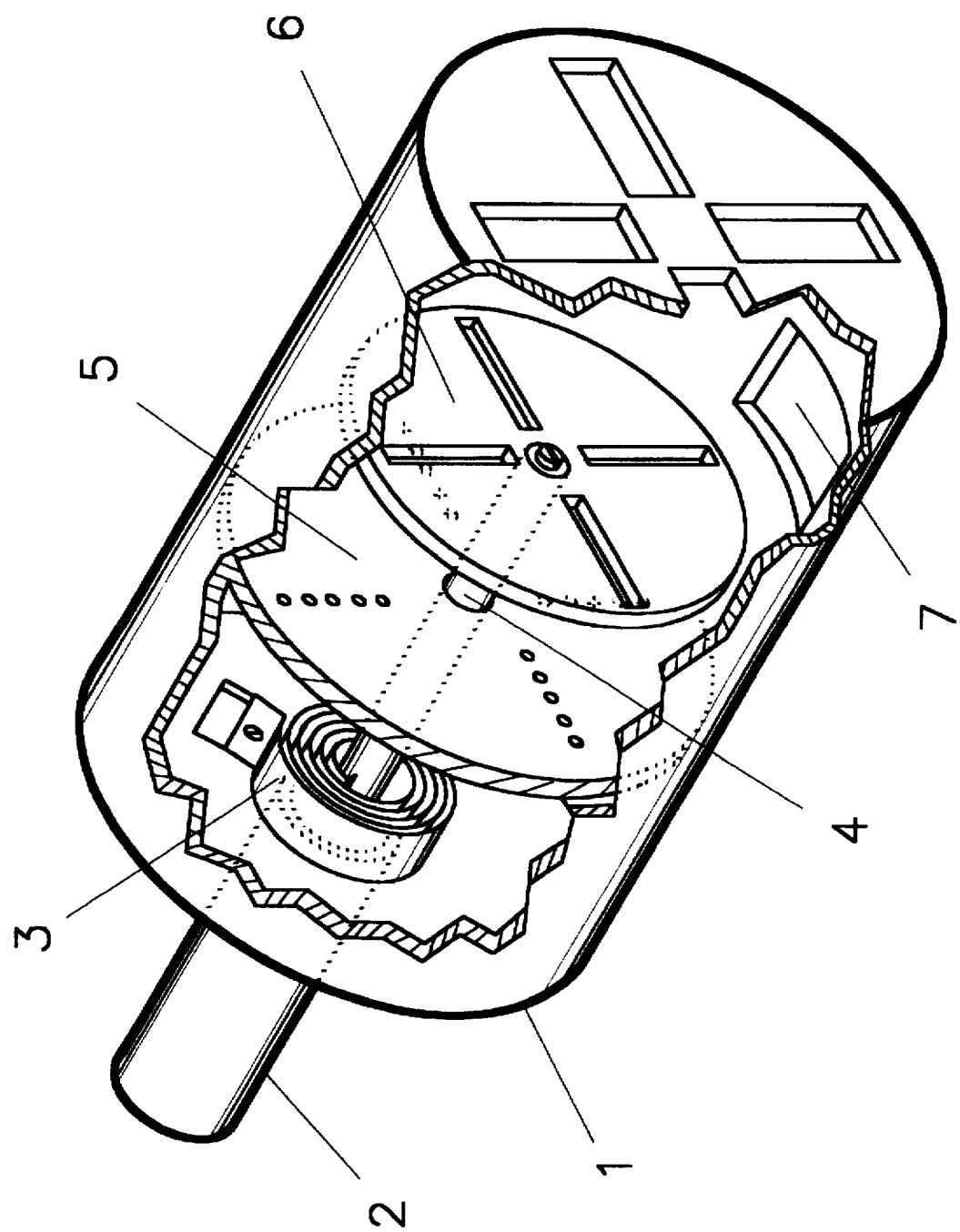
FIG. 2. is a isometric view of the mechanism.

The temperature responsive shower head assembly consists of an enclosed chamber, (1.) the inlet to which (2.) houses a coiled, bi-mettalic, thermally sensitive spring (3.) which turns clockwise or counter clockwise in response to water of various temperatures flowing over it on its way to the chamber. The rotating motion is transferred via a shaft, (4.) attached at one end to the center of the spring, running through the shower nozzle plate (5.) and attached at the other end to the rotating water stream diverting plate (6.). Water blocked by the diverting plate in the too hot or too cold position pours through a hole in the bottom of the unit (7.).

I claim:

1. A temperature sensitive shower head comprising:

(a) a hollow body defining an enclosed chamber having side walls, an inlet end, an outlet end having an array of openings therein, and a diversion opening in one of the side walls;

(b) a temperature sensitive coil spring disposed proximate to the inlet end;

(c) an intermediate nozzle plate disposed within the chamber and spaced apart from the outlet end so as to define a secondary chamber therebetween, the nozzle plate having a plurality of perforations disposed in an array, and the secondary chamber having the diversion opening therein;

(d) a diverting plate disposed within the secondary chamber adjacent the outlet end and having an array of openings therein which in one position are in alignment with the openings of the outlet end and in another position of the diverting plate are not in alignment with the openings of the outlet end;

(e) means for connecting the diverting plate with the temperature sensitive coil spring so that the plate is rotated in dependence on the temperature of the incoming water;

(f) the water being blocked from exiting the outlet end of the shower head when the openings of the diverting plate and the outlet end are not in alignment and exiting the secondary chamber through the diversion opening.

* * * * *